(12) United States Patent
Minemura et al.

(10) Patent No.: US 7,342,049 B2
(45) Date of Patent: Mar. 11, 2008

(54) DILATANT FLUID COMPOSITION

(75) Inventors: Masahiko Minemura, Gunma (JP);
Masanao Kamei, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 323 days.

(21) Appl. No.: 10/765,964

(22) Filed: Jan. 29, 2004

(65) Prior Publication Data
US 2004/0186224 A1 Sep. 23, 2004

(30) Foreign Application Priority Data
Jan. 30, 2003 (JP) ............................. 2003-021417

(51) Int. Cl.
*B01F 3/12* (2006.01)
*B01F 17/54* (2006.01)
*C01B 33/14* (2006.01)

(52) U.S. Cl. ........................... 516/34; 516/33; 524/588

(58) Field of Classification Search .................. 516/34, 516/33; 524/588
See application file for complete search history.

(56) References Cited
U.S. PATENT DOCUMENTS

| 3,047,507 A | | 7/1962 | Winslow ..................... 252/75 |
| 3,933,678 A | | 1/1976 | Graham ...................... 252/582 |
| 4,645,614 A | | 2/1987 | Goossens et al. ............. 252/75 |
| 5,391,314 A | * | 2/1995 | Minemura et al. ......... 252/78.3 |
| 5,503,763 A | | 4/1996 | Podszun et al. .............. 252/73 |
| 5,843,335 A | * | 12/1998 | Kurono et al. .............. 516/100 |
| 2004/0156809 A1 | * | 8/2004 | Ono et al. ................ 424/70.12 |

FOREIGN PATENT DOCUMENTS

| EP | 0 319 201 A2 | | 6/1989 |
| EP | 0 727 478 A2 | | 8/1996 |
| JP | 54-28832 | * | 3/1979 |
| JP | 55-115811 | * | 9/1980 |
| JP | 8-281095 A | | 10/1996 |
| WO | WO 94/10693 A1 | | 5/1994 |
| WO | WO 02/100356 A1 | * | 12/2002 |

OTHER PUBLICATIONS

Derwent Abstract on EAST, week 200391, London: Derwent Publications Ltd., AN 1980-74382C, Class A96, JP 55115811 A, (Shiseido Co Ltd), abstract.*
Derwent Abstract on EAST, week 200392, London: Derwent Publications Ltd., AN 1979-28586B, Class A26, JP 54028832 A, (Shiseido Co Ltd), abstract.*
H. A. Barnes et al., Journal of Rheology, 33(2), pp. 329-366 (1989), month unknown.

* cited by examiner

*Primary Examiner*—Daniel S. Metzmaier
(74) *Attorney, Agent, or Firm*—Birch, Stewart, Kolasch & Birch, LLP

(57) ABSTRACT

A novel dilatant fluid which keeps fluid state within a broad temperature range, is excellent in storage stability, has large mechanical strength and shows large changing quantity of viscosity resistance accompanied by the increase of shear stress. It was found that excellent dilatancy is expressed markedly specifically in a composition comprising (B) from 0.5 to 100 parts by weight of a particle dispersing agent and (C) from 5 to 1,000 parts by weight of a silicone medium, based on (A) 100 parts by weight an inorganic fine particle having a primary particle size of from 2 nm to 30 μm.

6 Claims, No Drawings

DILATANT FLUID COMPOSITION

This Non-provisional application claims priority under 35 U.S.C. § 119(a) on Patent Application No(s). 2003-021417 filed in Japan on Jan. 30, 2003, the entire contents of which are hereby incorporated by reference.

FIELD OF THE INVENTION

This invention relates to a dilatancy liquid which shows high viscosity under high shearing force and shows low viscosity under low shearing force. Such a liquid is useful as a working fluid for a clutch, vibration insulation apparatus and the like, which is arranged between two adjacent objects capable of performing relative displacement and transfers high torque at a high rate of shear or low torque at a low rate of shear.

BACKGROUND OF THE INVENTION

It is conventionally known that when shear force is added to a liquid in which fine particles are dispersed, it shows low viscosity under low shear force, but when the shear force to be added is increased, it shows a phenomenon of suddenly showing high viscosity, namely dilatancy. This dilatancy is a phenomenon caused by a temporal change in the packing condition of particles due to a sudden external force. When an assembly of spherical particles having the same size is considered for the sake of simplicity, theoretical value of void volume in the closest packing is 26%.

Under such a condition, the assembly of spherical particles can gently flow when a liquid sufficient for filling gaps among particles is absorbed. However, when a strong external force is suddenly added thereto, the assembly of spherical particles is transferred to a rough packing state. For example, since the void volume in the most rough packing is 48%, the aforementioned liquid is not sufficient even when the entire volume thereof is absorbed into the increased volume, thus entailing the presence of particles which are not soaked in the liquid but wear with one another.

This is the cause of the behavior similar to a brittle solid matter, effected in the dilatancy by the absorption of the liquid from the surface into inside and subsequent swelling of the volume and loss of the fluidity. An example of this is a phenomenon in which, when stepped on a seaside wet sandy soil with a foot, gaps among the sand particles are expanded and sea water is absorbed into sands so that the sandy soil looks like dry and becomes solid. The dilatancy phenomenon can also be observed when a precipitate of an inorganic crystals is filtered under reduced pressure.

"Dilatal" (registered trademark) manufactured by BASF, Germany, is known as a dilatant fluid. This is a product prepared by dispersing fine particles of an acrylic acid ester-styrene copolymer in water. Also, a fluid which shows dilatancy and comprises inorganic compound fine particles having a sphericity factor of 1.1 or less and a liquid medium has been reported in JP-A-8-281095, and the use of a silicone oil as the liquid medium is described in its claim.

Since the dispersion medium of conventionally known dilatant fluid is water or a volatile solvent, they have a problem in that the dispersing medium solidifies at low temperature and is apt to volatilize at high temperature. Even in case that the problem is not so serious, there is another problem in that they can be used only at around room temperature because of severe changes in viscosity. Also, though JP-A-8-281095 describes the use of "silicone oil" as the medium, there is no detailed description on the silicone oil, and there is no description on a particle dispersing agent in case that the silicone oil is used. Accordingly, they have a disadvantage in that, since the dispersed particles are hardly compatible with the medium silicone oil, the particles cannot be dispersed uniformly in a high blending ratio and are apt to cause precipitation thus entailing poor storage stability.

SUMMARY OF THE INVENTION

The problem of the invention is to provide a novel dilatant fluid which keeps fluid state within a broad temperature range, is excellent in storage stability, has large mechanical strength and shows large changing quantity of viscosity resistance accompanied by the increase of shear stress.

As a result of extensive studies carried out with the aim of solving the aforementioned problems, the present inventors have found a dilatancy fluid composition comprising from 0.5 to 100 parts by weight of a particle dispersing agent and from 5 to 1,000 parts by weight of a silicone medium, based on 100 parts by weight an inorganic fine particle having a primary particle size of from 2 nm to 30 μm, which becomes a sol state under low shearing force and becomes a gel state under high shearing force.

This dilatancy fluid is excellent in storage stability, keeps fluid state within a broad temperature range, has large mechanical strength and shows large changing quantity of viscosity resistance accompanied by the increase of shear stress.

DETAILED DESCRIPTION OF THE INVENTION

The following describes the invention in detail.

The invention is based on a finding that a markedly and specifically excellent dilatancy is expressed in a composition comprising (B) from 0.5 to 100 parts by weight of a particle dispersing agent and (C) from 5 to 1,000 parts by weight of a silicone medium, based on (A) 100 parts by weight an inorganic fine particle having a primary particle size of from 2 nm to 30 μm.

The inorganic fine particles as the component (A) constituting the invention have a primary particle size of from 2 nm to 30 μm, more preferably 2 nm to 50 nm. The primary particle size is measured by visual observation on microphotograph.

When the particle size is too large, dispersion of the particles becomes so unstable that they are precipitated and separated from the dispersing medium. When the particle size is too small, it is not desirable because viscosity under a state of sol is increased so that the dilatancy is not obtained.

It is desirable that the surface condition of the inorganic fine particles of the invention is smooth with less irregularity and close to spherical shape. Examples of the inorganic fine particles of the invention include silica, alumina, magnesia, zirconia, titanium oxide, zirconium oxide, zinc oxide, cerium oxide, magnesium oxide, barium sulfate, calcium sulfate, magnesium sulfate, calcium carbonate, magnesium carbonate, talc, mica, kaolin, sericite, muscovite, synthetic mica, phlogopite, epidolite, biotite, lithia mica, silicic acid, silicic anhydride, aluminum silicate, magnesium silicate, magnesium aluminum silicate, calcium silicate, barium silicate, strontium silicate, tungstic acid metal salts, hydroxyapatite, vermiculite, haidingerite, bentonite, montmorillonite, hectorite, zeolite, ceramics powder, calcium secondary phosphate, aluminum hydroxide, boron nitride and the like, of which silica is more preferable.

The inorganic particle of the invention may not be treat the powder surface with surface treatment particularly, but it may be treated to show hydrophobicity for the purpose of preventing aggregation and moisture absorption under a powdery state. Its specific surface area is not particularly limited because it varies depending on the inorganic particle to be used, but id preferably from 50 to 500 m²/g, and it is desirable that its pH is neutral (e.g., pH 5 to 8, more preferably about 7) and the adsorbed moisture is 10% or less. Other physical properties, amounts of impurities and the like of the particle are not particularly limited.

The particle dispersing agent as the component (B) of the invention is used for obtaining high formulation ratio by improving affinity of the inorganic particle for the silicone medium, and it is desirable to use a dispersing agent having a siloxane bond, represented by the following general formula (1)

$$R^1{}_a R^2{}_b SiO_{(4-a-b)/2} \qquad (1)$$

[wherein $R^1$ is independently selected from alkyl groups, aryl groups or aralkyl groups having carbon atoms of from 1 to 30, and $R^2$ is a substituent residues having alkylene oxide group or hydroxyl group, wherein a and b are respectively $0.01 \leq a \leq 2.5$ and $0.01 \leq b \leq 2.5$, and also $0.05 < a+b \leq 3.0$].

Illustrative examples of the $R^1$ in the general formula (1) include alkyl groups having from 1 to 30 (preferably from 1 to 8) carbon atoms such as methyl, ethyl, propyl, butyl, pentyl, hexyl, heptyl, octyl, nonyl, decyl group and the like, cycloalkyl groups having from 3 to 20 (preferably from 5 to 12) carbon atoms such as cyclopentyl, cyclohexyl group and the like, aryl groups having from 6 to 20 (preferably from 6 to 12) carbon atoms such as phenyl, tolyl group and the like and aralkyl groups having from 7 to 20 (preferably from 7 to 13) carbon atoms such as benzyl, phenetyl group and the like. Among thse, methyl, ethyl and phenyl groups are preferred.

In addition, weight average molecular weight of the silicone compound represented by the formula (1) is not particularly limited, but is preferably from 500 to 10,000, particularly preferably from 1,000 to 5,000.

Illustrative examples of the particle dispersing agent as the component (B) of the invention include polysiloxane diols represented by the following general formulae (2) and (3)

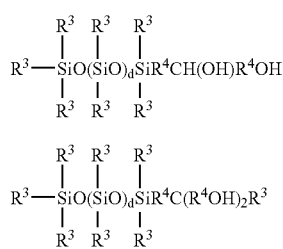

wherein $R^3$ is independently selected from alkyl groups or aryl groups having carbon atoms of from 1 to 8. For examples of alkyl groups include methyl, ethyl or octyl group is preferred, and aryl groups include phenyl group is preferred. Also, the $R^4$ is independently selected from divalent groups such as an alkylene group or a divalent substituent group having an ester bond or ether bond. For examples, ethylene, trimethylene, 2-oxapentamethylene, 3-oxahexamethylene group is preferred. The symbol d is an integer of $1 \leq d \leq 1,000$.

Further preferred is a silicone oil having a hydroxyl group at one terminal thereof represented by the following formula

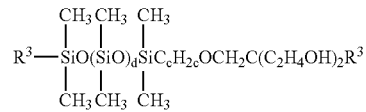

(wherein $R^3$ in the formula represents the aforementioned group, d is an integer of $1 \leq d \leq 1,000$, and c is an integer of $2 \leq c \leq 5$).

An illustrative examples of the particle dispersing agent as the other component (B) of the invention is a copolymer of a (meth)acryl monomer with a siloxane having a (meth)acryl group at one terminal thereof. Amount of the siloxane modification of this copolymer is preferably from 30 to 95% by weight, more preferably from 60 to 90% by weight.

As such a copolymer, an acryl-silicone copolymer obtained by copolymerizing a (meth)acryl group-containing siloxane represented by the following general formula (4) with a (meth)acryl monomer represented by the following general formula (7) can be used in the present invention.

Illustratively, an acryl-silicone copolymer which is obtained by copolymerizing from 30 to 95% by weight of a (meth)acryl group-containing siloxane compound represented by the following general formula (4)

[wherein A is a radically polymerizable group represented by the following general formula (5) or (6)

$$CH_2=C(R^6)COOR^7— \qquad (5)$$

$$CH_2=C(R^6)C_6H_5— \qquad (6)$$

(wherein $R^6$ is selected from hydrogen atom and methyl group, $R^7$ is an alkylene groups having carbon atoms of from 1 to 10, and n is an integer of from 3 to 500), and $R^5$ is independently selected from alkyl groups having from 1 to 30 carbon atoms, an aryl group, an aralkyl group and a fluorine-substituted alkyl group]

with from 70 to 5% by weight of a (meth)acryl monomer represented by the following general formula (7)

$$CH_2=C(C^8)COOR^9 \qquad (7)$$

(wherein $R^8$ is selected from hydrogen atom and methyl group, and $R^9$ is an alkyl groups having carbon atoms of from 1 to 10 is used.

The organopolysiloxane compound having a radically polymerizable group represented by the general formula (4) is also called silicone macromonomer which is a compound having a radically polymerizable group at one terminal. In this case, A is a radically polymerizable monovalent organic group which can be represented by the above general formula (5) or (6), and its illustrative examples include methyl (meth)acrylate group, propyl (meth)acrylate group, decyl (meth)acrylate group, styryl group, α-methylstyryl group and the like. Illustrative examples of $R^1$ include alkyl groups such as methyl, ethyl, propyl, butyl group, pentyl, hexyl, heptyl, octyl, nonyl, decyl, cyclohexyl group and the like, aryl groups such as phenyl, tolyl group and the like, aralkyl groups such as benzyl, phenetyl group and the like, and fluorine-substituted alkyl groups such as trifluoropropyl, nonafluorobutylethyl group and the like.

Illustrative examples of the acrylic monomer of general formula (7) include methyl (meth)acrylate, ethyl (meth) acrylate, iso-propyl (meth)acrylate, n-butyl (meth)acrylate, t-butyl (meth)acrylate, cyclohexyl (meth)acrylate, 2-ethylhexyl (meth)acrylate, tridecyl (meth)acrylate, stearyl (meth) acrylate, iso-stearyl (meth)acrylate, behenyl (meth)acrylate and the like, which can be used alone or in a mixture of two or more of them.

Regarding the ratio of the compounds of the aforementioned general formulae (4) and (7) to be used in the copolymerization, the organopolysiloxane compound having a radically polymerizable group of the general formula (4) is from 30 to 95% by weight, preferably from 60 to 90% by weight, and the acrylic monomer of the general formula (7) is from 5 to 70% by weight, preferably from 10 to 40% by weight.

Regarding the dispersion medium silicone as the component (C), a cyclic or straight chain dimethyl silicone oil or methylphenyl silicone oil is preferred, and more preferred is an oil having a boiling point of higher than 100° C. and a viscosity of 100,000 mm$^2$/s or less. When the boiling point is 100° C. or less, weight loss periodically occurs due to high volatility and the composition ratio and dilatancy of the fluid are changed. Also, when the oil has a viscosity of 100,000 mm$^2$/s or more, blending amount of the inorganic particles cannot be increased, so that the difference between the viscosity at the time of low torque and the viscosity at the time of high torque becomes small as a result.

In the dilatant fluid of the invention, mixing weight ratio of the particle dispersing agent is from 0.5 to 100 parts by weight based on 100 parts by weight of the inorganic fine particles, preferably from 1 to 40 parts by weight. When mixing weight ratio of the particle dispersing agent is small, dispersion of the inorganic fine particles becomes so poor that a uniform fluid composition cannot be obtained. When it is too large, on the other hand, the dilatancy of the fluid cannot be obtained.

Desired mixing weight ratio of the silicone medium based on 100 parts by weight of the inorganic fine particles is from 5 to 1,000 parts by weight, and more preferably from 50 to 300 parts by weight. When the amount is below 5 parts by weight of the silicone oil, a uniform fluid composition cannot be obtained and when the amount is above 1,000 parts by weight of the silicone oil, on the other hand, the dilatancy of the fluid cannot be obtained.

The composition of the invention can be prepared by known methods.

[Method for the Treatment of Particles with Dispersing Agent]

The particle surface can be treated with the particle dispersing agent by a known method. For example, it can be optionally selected from the following methods.

1. A method in which the particles of interest are surface-treated by dispersing them in a medium selected from organic solvents containing a treating agent.

2. A method in which the particles are mixed with a particle-treating agent and then surface-treated using a ball mill, jet mill or the like pulverizer.

3. A treating method in which a treating agent is mixed in a solvent, the particles are dispersed therein to allow the agent to adsorb to their surfaces, and then the particles are dried and sintered.

[Method for the Production of Powder Dispersion in Oil]

A dispersion of the surface-treated particles can be prepared by a known method. For example, it can be easily obtained by 1. a method in which the dispersing agent-treated powder composition obtained in the above is dispersed by adding it to a silicone oil or the like oil, or 2. a method in which the particle dispersing agent is dissolved or dispersed in a silicone medium, and the inorganic particles are added thereto and mixed using a ball mill, beads mill, sand mill, planetary mixer or the like dispersing apparatus.

According to the dilatant fluid of the invention, it is possible to improve its fluidity by changing dispersed state of the inorganic compound, by adding a fluidity-improving agent and thereby controlling its polarity.

In addition, it may be made into a grease-like form which hardly flows under a low shearing force or atmospheric pressure, by adding a thickener or gel material thereto and thereby providing thixotropy.

Regarding the production method of the dilatant fluid of the invention, it is desirable to use a method in which the inorganic compound particles, particle dispersing anent and silicone medium are uniformly dispersed by mixing them under a high temperature of 60° C. or more, or the inorganic compound particles and particle dispersing anent are gradually added to and dispersed in the silicone medium while mixing.

The dilatant fluid of the invention has excellent characteristics in that it keeps liquid state within a broad temperature range, is excellent in storage stability, has large mechanical strength and shows large changing quantity of viscosity resistance accompanied by the increase of shear stress. Accordingly, the dilatant fluid of the invention is useful as a damper material or a working fluid for a clutch or the like torque transferring apparatus, damping or vibration insulation apparatus and the like.

The invention is further described in the following with reference to examples, but the invention is not restricted thereby.

INVENTIVE EXAMPLE 1

A mixed liquid of 65 parts by weight of decamethylcyclopentasiloxane and 10 parts by weight of a one terminus carbinol-modified silicone oil [trade name: X-22-176DX, manufactured by Shin-Etsu Chemical Co., Ltd.] was mixed with 25 parts by weight of hydrophobic ultra-fine particle amorphous silica (average primary particle size=12 nm) using a planetary mixer to obtain a translucent white liquid.

INVENTIVE EXAMPLE 2

A mixed liquid of 65 parts by weight of decamethylcyclopentasiloxane and 10 parts by weight of a silicone-modified acrylic resin [trade name: KP-545, manufactured by Shin-Etsu Chemical Co., Ltd.] was mixed with 25 parts by weight of hydrophobic ultra-fine particle amorphous silica (average primary particle size=12 nm) using a planetary mixer to obtain a white liquid.

INVENTIVE EXAMPLE 3

A mixed liquid of 65 parts by weight of dimethylsiloxane [trade name: KF96 (5 cs), manufactured by Shin-Etsu Chemical Co., Ltd.] and 10 parts by weight of a one terminus carbinol-modified siloxane [trade name: X-22-176A, manufactured by Shin-Etsu Chemical Co., Ltd.] was mixed with 25 parts by weight of hydrophobic ultra-fine particle amorphous silica (average primary particle size=12 nm) using a planetary mixer to obtain a white liquid.

COMPARATIVE EXAMPLE 1

When 100 parts by weight of a silicone resin powder [trade name: KMP-590, manufactured by Shin-Etsu Chemical Co., Ltd.] and 53 parts by weight of dimethylsiloxane having a viscosity at 25° C. of 10 mm²/s [trade name: KF96 (10 cs), manufactured by Shin-Etsu Chemical Co., Ltd.] were put into a reaction glass flask, mixed and stirred at 80° C. for 30 minutes, the mixture became a hard compound.

COMPARATIVE EXAMPLE 2

When the same method of Comparative Example 1 was carried out by changing 53 parts by weight of the dimethylsiloxane (25° C. viscosity 10 mm²/s) of Comparative Example 1 to 65 parts by weight, 118 parts by weight of white liquid was obtained.

Using each of the liquids obtained in Inventive Examples and Comparative Examples, a relationship between rotor revolution speed and viscosity (unit, cp) was measured by a rotational viscometer (Type B8U, No. 5 rotor) manufactured by Tokyo Keiki Co., Ltd., with the results showing in Table 1.

TABLE 1

| | Temp. (° C.) | Viscosity (mm²/s) | | | Uniformity |
|---|---|---|---|---|---|
| | | 20 rpm | 50 rpm | 100 rpm | |
| Inv. Ex. 1 | 25 | 2170 | 6800 | 12300 | ○ |
| Inv. Ex. 1 | −5 | 3200 | 7900 | 25000 | ○ |
| Inv. Ex. 2 | 25 | 4480 | 6500 | 11200 | ○ |
| Inv. Ex. 3 | 25 | 1300 | 2500 | 6500 | ○ |
| Comp. Ex. 2 | 25 | 19500 | 11500 | 7550 | X |

Uniformity: Sedimentation degree of particles after 60° C./1 week was observed.

SUMMARIZATION OF EXAMPLES

As can be understood from Comparative Examples, dilatancy cannot be found in the case of usual siloxane such as dimethylsiloxane, because viscosity is reduced as the rotor revolution speed is increased, but in the case of the compositions of the invention, viscosity is increased as the rotor revolution speed is increased, that is, dilatancy is observed. What is more, it can be understood that when water is used as the solvent, dilatancy is expressed even at −5° C. which is the solidifying temperature of water. In addition, regarding storage stability, particles are apt to precipitate in Comparative Examples, while they hardly precipitate in Inventive Examples.

While the invention has been described in detail and with reference to specific embodiments thereof, it will be apparent to one skilled in the art that various changes and modifications can be made therein without departing from the scope thereof.

This application is based on Japanese patent application No. 2003-021417 filed Jan. 30, 2003, the entire contents thereof being hereby incorporated by reference.

What is claimed is:

1. A dilatant fluid composition comprising:
   (A) 100 parts by weight of an inorganic fine particle having a primary particle size of from 2 nm to 30 μm;
   (B) 0.5 to 100 parts by weight of a particle dispersing agent which is a polysiloxane diol represented by the general formula (2) or (3)

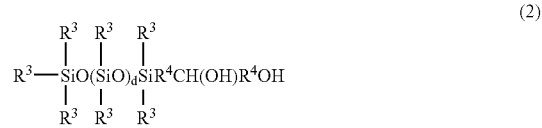

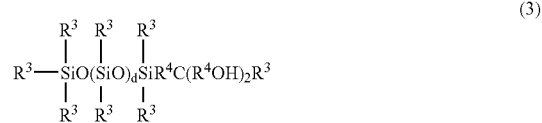

wherein each $R^3$ independently represents a $C_{1-8}$ alkyl group or an aryl group having up to 8 carbon atoms, each $R^4$ independently represents a divalent group or a divalent substituent group having an ester bond or an ether bond, and d is an integer of $1 \leq d \leq 1000$; and
   (C) 5 to 1000 parts by weight of a cyclic or linear dimethyl silicone oil or methyl phenyl silicone oil distinct from (B).

2. The dilatant fluid composition described in claim 1, wherein the inorganic fine particle of the component (A) is an inorganic particle having a primary particle size of from 2 to 50 nm.

3. The dilatant fluid composition described in claim 1 or 2, wherein the inorganic fine particle of the component (A) is silica.

4. The dilatant fluid composition of claim 1, wherein the particle dispersing agent of component (B) is a silicone oil having a hydroxyl group at one terminal therefore represented by the formula

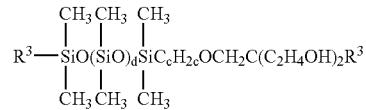

wherein $R^3$ represents a $C_{1-8}$ alkyl group or an aryl group having up to 8 carbon atoms, c is an integer of $2 \leq c \leq 5$, and d is an integer of $1 \leq d \leq 1000$.

5. The dilatant fluid composition of claim 4, wherein the inorganic fine particle of the component (A) is an inorganic particle having a primary particle size of from 2 to 50 nm.

6. The dilatant fluid composition of claim 4 or 5, wherein the inorganic fine particle of component (A) is silica.

* * * * *